(12) United States Patent
Hwang et al.

(10) Patent No.: US 11,753,510 B2
(45) Date of Patent: Sep. 12, 2023

(54) BIODEGRADABLE COMPOSITE MATERIAL HAVING IMPROVED MECHANICAL PROPERTIES USING NATURAL POLYMER NANOFIBER AQUEOUS DISPERSION AND METHOD OF PRODUCING THE SAME

(71) Applicant: KOREA RESEARCH INSTITUTE OF CHEMICAL TECHNOLOGY, Daejeon (KR)

(72) Inventors: Sung Yeon Hwang, Daejeon (KR); Jeyoung Park, Daejeon (KR); Dong Yeop Oh, Daejeon (KR); Tae Ho Kim, Daejeon (KR); Si Gyeong Lee, Daejeon (KR); Myung Suk Shin, Daejeon (KR); Jong Geon Jegal, Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 17/597,430

(22) PCT Filed: May 28, 2020

(86) PCT No.: PCT/KR2020/006880
§ 371 (c)(1),
(2) Date: Jan. 5, 2022

(87) PCT Pub. No.: WO2021/006480
PCT Pub. Date: Jan. 14, 2021

(65) Prior Publication Data
US 2022/0282048 A1    Sep. 8, 2022

(30) Foreign Application Priority Data
Jul. 11, 2019 (KR) .................. 10-2019-0083851

(51) Int. Cl.
C08J 5/04 (2006.01)
C08G 63/12 (2006.01)
C08G 63/81 (2006.01)
C08K 7/02 (2006.01)

(52) U.S. Cl.
CPC .............. *C08J 5/045* (2013.01); *C08G 63/12* (2013.01); *C08G 63/81* (2013.01); *C08K 7/02* (2013.01); C08G 2230/00 (2013.01); C08J 2367/02 (2013.01); C08K 2201/005 (2013.01); C08K 2201/011 (2013.01); C08K 2201/018 (2013.01)

(58) Field of Classification Search
None
See application file for complete search history.

(56) References Cited

U.S. PATENT DOCUMENTS

| 2016/0200862 A1* | 7/2016 | Bastioli | C08L 67/02 |
| | | | 525/411 |
| 2016/0376749 A1* | 12/2016 | Lim | C08B 15/00 |
| | | | 162/70 |

FOREIGN PATENT DOCUMENTS

| JP | 2016-153470 A | 8/2016 |
| KR | 101550656 B1 | 9/2015 |
| KR | 101626997 B1 | 6/2016 |
| KR | 101897180 B1 | 9/2018 |
| KR | 20190032303 A | 3/2019 |
| KR | 102069075 B1 | 1/2020 |
| WO | WO 2013/032091 A1 | 3/2013 |

OTHER PUBLICATIONS

Machine translation of Mohammed et al. (JP 2016/153470) (Year: 2016).*
Office Action issued to the corresponding Chinese Patent Application No. 202080048009.3, dated Aug. 31, 2022.

\* cited by examiner

*Primary Examiner* — Robert T Butcher
(74) *Attorney, Agent, or Firm* — Knobbe, Martens, Olson & Bear, LLP

(57) ABSTRACT

A biodegradable composite material which is produced by polymerizing a mixture of an aqueous dispersion of a natural polymer nanofiber including any one or more of a chitin nanofiber and a cellulose nanofiber, a dicarboxylic acid or a derivative thereof, and a diol. The biodegradable composite material has excellent biodegradable and mechanical properties.

10 Claims, No Drawings

BIODEGRADABLE COMPOSITE MATERIAL HAVING IMPROVED MECHANICAL PROPERTIES USING NATURAL POLYMER NANOFIBER AQUEOUS DISPERSION AND METHOD OF PRODUCING THE SAME

CROSS-REFERENCE TO RELATED APPLICATIONS

This application is a U.S. National Phase Application of PCT International Application No. PCT/KR2020/006880, filed on May 28, 2020, designating the United States of America, which is an International Application of and claims the benefit of priority to Korean Patent Application No. 10-2019-0083851, filed on Jul. 11, 2019, the entire contents of which are incorporated herein by reference.

TECHNICAL FIELD

The present invention relates to a biodegradable composite material and a method of producing the same.

BACKGROUND ART

A commercialized general-purpose plastic, for example, polyethylene, polypropylene, or the like has poor degradability in a natural state and has a problem of adversely affecting the environment upon disposal.

However, due to the excellent physical properties of the general-purpose plastic, a proportion of the products using the plastic is even gradually increasing. Thus, as a part of the prevention of environmental pollution, development of a material which may replace the general-purpose plastic is constantly urged.

As part of that, a biodegradable plastic is attracting attention. Since the biodegradable plastic may be naturally decomposed upon soil reclamation, there is almost no environmental load. Examples of the biodegradable plastic include polylactic acid (PLA), polybutylene succinate (PBS), polybutylene adipate-co-terephthalate (PBAT), and the like.

However, in spite of its excellent biodegradability, the biodegradable plastic lacks mechanical properties, and thus, it is still impossible to replace the general-purpose plastic. Accordingly, for market expansion of the biodegradable material, the poor mechanical property problem should be necessarily solved.

Thus, the present inventors have provided a biodegradable PBS composite material having improved mechanical properties, as confirmed in Korean Patent Registration Publication No. 10-1897180.

However, the present inventors continuously conducted an in-depth study for providing a biodegradable composite material having better mechanical properties, and as a result, completed the present invention.

DISCLOSURE

Technical Tasks

An object of the present invention is to provide a biodegradable composite material having improved mechanical properties.

Technical Solution

In one general aspect, a biodegradable composite material which is produced by polymerizing a mixture including: an aqueous dispersion of a natural polymer nanofiber including any one or more selected from a chitin nanofiber and a cellulose nanofiber; a dicarboxylic acid or a derivative thereof; and a diol, is provided.

In an exemplary embodiment of the present invention, an amount of the natural polymer nanofiber in the aqueous dispersion of the natural polymer nanofiber may be 0.005 to 2 wt %, based on a total of 100 wt % of the biodegradable composite material.

In an exemplary embodiment of the present invention, a concentration of the natural polymer nanofiber in the aqueous dispersion of the natural polymer nanofiber may be 0.1 to 50 wt %.

In an exemplary embodiment of the present invention, the natural polymer nanofiber may have a diameter of 1 to 200 nm and a length of 100 nm to 100 µm.

In an exemplary embodiment of the present invention, the biodegradable composite material may be produced by polymerizing the mixture further including: any one or more selected from a tri- or higher functional alcohol; a tri- or higher functional carboxylic acid or a derivative thereof; and a tri- or higher functional hydroxy acid or a derivative thereof.

In an exemplary embodiment of the present invention, the biodegradable composite material may satisfy the following Equation 1:

$$\frac{TS_1}{TS_0} \times 100 \geq 110(\%) \quad \text{[Equation 1]}$$

wherein $TS_1$ is a tensile strength of the biodegradable composite material, and $TS_0$ is a tensile strength of a material obtained by polymerizing the mixture without the aqueous dispersion of the natural polymer nanofiber.

In an exemplary embodiment of the present invention, the biodegradable composite material may satisfy the following Equation 2:

$$\frac{TT_1}{TT_0} \times 100 \geq 110(\%) \quad \text{[Equation 2]}$$

wherein $TT_1$ is a tear strength of the biodegradable composite material, and $TT0$ is a tear strength of a material obtained by polymerizing the mixture without the aqueous dispersion of the natural polymer nanofiber.

In another general aspect, a method of producing a biodegradable composite material includes: preparing a mixed dispersion including an aqueous dispersion of a natural polymer nanofiber including any one or more selected from a chitin nanofiber and a cellulose nanofiber, a dicarboxylic acid or a derivative thereof, and a diol; and polymerizing the mixed dispersion.

In an exemplary embodiment of the production method of the present invention, the mixed dispersion may further include any one or more selected from a tri- or higher functional alcohol; a tri- or higher functional carboxylic acid or a derivative thereof; and a tri- or higher functional hydroxy acid or a derivative thereof.

In an exemplary embodiment of the production method of the present invention, the step of preparing a mixed dispersion may include: preparing a slurry including a dicarboxylic acid or a derivative thereof and a diol;

homogenizing the slurry; and mixing the homogenized slurry with an aqueous dispersion of a natural polymer nanofiber including any one or more selected from a chitin nanofiber and a cellulose nanofiber.

In still another general aspect, a method of producing a biodegradable composite material includes: preparing a mixed dispersion including an aqueous dispersion of a natural polymer nanofiber including any one or more selected from a chitin nanofiber and a cellulose nanofiber, a first dicarboxylic acid or a derivative thereof, and a first diol;

subjecting the mixed dispersion to an esterification or transesterification reaction to form an oligomer; and further introducing a second dicarboxylic acid or a derivative thereof and a second diol to the oligomer and performing polymerization.

Advantageous Effects

The present invention may provide a biodegradable composite material having significantly improved mechanical properties, for example, a tensile strength, an elongation, and a tear strength, and a method of producing the same.

BEST MODE

Hereinafter, the present invention will be described in detail.

The present invention relates to a composite material having excellent biodegradability and mechanical properties.

Specifically, the present invention relates to a biodegradable composite material which is produced by polymerizing a mixture including an aqueous dispersion of a natural polymer nanofiber; a dicarboxylic acid or a derivative thereof; and a diol.

The biodegradable composite material of the present invention is produced by polymerizing a dicarboxylic acid or a derivative thereof and a diol in a monomer phase with an aqueous dispersion of a natural polymer nanofiber. Thus, the natural polymer nanofiber may be uniformly scattered between chains derived from the dicarboxylic acid or the derivative thereof and the diol to form a crosslinking point, and significantly improved mechanical properties may be implemented.

In particular, the present invention has a big feature in adopting not the natural polymer nanofiber itself, but the aqueous dispersion thereof.

The present inventors have provided a biodegradable PBS composite material produced by polymerizing 1,4-butane diol, a succinic acid, and a cellulose nanofiber in-situ in the previous patent (Korean Patent Registration Publication No. 10-1897180).

However, the present inventors continuously conducted an in-depth study for providing a biodegradable composite material having better mechanical properties. As a result, it was found that when an aqueous dispersion of the cellulose nanofiber is used instead of the cellulose nanofiber itself, the mechanical properties of the biodegradable composite material are significantly improved.

Specifically, the biodegradable composite material of the present invention which is produced using the aqueous dispersion of the natural polymer nanofiber showed higher values in a tensile strength, an elongation, and a tear strength by about 20% or more, as compared with a biodegradable composite material produced using the natural polymer nanofiber itself. Moreover, the biodegradable composite material of the present invention showed as much as twice or more the tensile strength, the elongation, and the tear strength values of a biodegradable plastic in which the natural polymer nanofiber is not used.

That is, the biodegradable composite material of the present invention has a feature of significantly improved mechanical properties as well as excellent biodegradability, by adopting an aqueous dispersion of the natural polymer nanofiber at the time of production thereof. Therefore, the biodegradable composite material of the present invention is considered to heavily influence expansion of a biodegradable material market and prevention of environmental pollution.

For reference, the biodegradable composite material of the present invention is not produced by first preparing polyester from a dicarboxylic acid or a derivative thereof and a diol, and compounding the polyester with a natural polymer nanofiber by a melt mixing method or a solution mixing method. Since it is described in detail that such biodegradable composite material has poor physical properties in the previous patent of the present inventors (Korean Patent Registration Publication No. 10-1897180), it will not be described in detail in the present specification.

Hereinafter, each constituent element of the present invention will be described in more detail.

In the present invention, the aqueous dispersion of a natural polymer nanofiber may be an aqueous dispersion including a natural polymer nanofiber as a dispersoid and water, for example, distilled water as a dispersion medium.

The natural polymer nanofiber may refer to that derived from a natural polymer present in nature, for example, chitin, cellulose, or the like.

More specifically, the natural polymer nanofiber may be produced by nanofiberizing a natural polymer such as chitin or cellulose by a physical or chemical method which may be adopted and applied in the art.

In an exemplary embodiment of the present invention, the natural polymer nanofiber may be any one or more selected from a chitin nanofiber, a cellulose nanofiber, and the like.

That is, in an exemplary embodiment of the present invention, the aqueous dispersion of the natural polymer nanofiber may include any one or more natural polymer nanofibers selected from a chitin nanofiber, a cellulose nanofiber, and the like.

In an exemplary embodiment of the present invention, an amount of the natural polymer nanofiber in the aqueous dispersion of the natural polymer nanofiber may be 0.005 to 2 wt %, more preferably 0.01 to 1 wt %, and still more preferably 0.05 to 0.5 wt %, based on a total of 100 wt % of the biodegradable composite material. In this case, the biodegradable composite material may show excellent mechanical properties. In particular, the amount of the natural polymer nanofiber is in a range of 0.05 to 0.5 wt %, the biodegradable composite material shows significantly improved mechanical properties, and may be preferred in the present invention.

In an exemplary embodiment of the present invention, a concentration of the natural polymer nanofiber in the aqueous dispersion of the natural polymer nanofiber may be 0.1 to 50 wt %.

In an exemplary embodiment of the present invention, the natural polymer nanofiber may have a diameter of 1 to 200 nm, more preferably 1 to 100 nm, and still more preferably 1 to 50 nm. In addition, the length may be 100 nm to 100 μm and more preferably 100 nm to 10 μm. In this case, the biodegradable composite material may have more improved mechanical properties.

In an exemplary embodiment of the present invention, the dicarboxylic acid may be any one or more selected from an aliphatic dicarboxylic acid and an aromatic dicarboxylic acid.

In some exemplary embodiment, the aliphatic dicarboxylic acid may be any one or more selected from oxalic acid, malonic acid, succinic acid, maleic acid, fumaric acid, glutaric acid, adipic acid, pimelic acid, suberic acid, azelaic acid, sebacic acid, dodecanedicarboxylic acid, 1,4-cyclohexanedicarboxylic acid, and the like.

In some exemplary embodiments, the aromatic dicarboxylic acid may be any one or more selected from phthalic acid, terephthalic acid, isophthalic acid, 1,4-naphthalenedicarboxylic acid, 1,5-naphthalenedicarboxylic acid, 2,6-naphthalenedicarboxylic acid, 1,8-naphthalenedicarboxylic acid, 4,4'-diphenyldicarboxylic acid, 4,4'-diphenyletherdicarboxylic acid, anthracenedicarboxylic acid, phenanthrenedicarboxylic acid, and the like.

In an exemplary embodiment of the present invention, the diol may be an aliphatic diol, and for example, any one or more selected from ethanediol, 1,2-propanediol, 1,3-propanediol, 2-methyl-1,3-propanediol, 2,2-dimethyl-1,3-propanediol, 2,2-diethyl-1,3-propanediol, 2-ethyl-2-isobutyl-1,3-propanediol, 1,2-butanediol, 1,4-butanediol, 1,5-pentanediol, 3-methyl-1,5-pentanediol, 2,2,4-trimethyl-1,3-pentanediol, 1,6-hexanediol, 2-ethyl-1,3-hexanediol, 2,4-dimethyl-2-ethyl-1,3-hexanediol, 2,2,4-trimethyl-1,6-hexanediol, 2-methyl-1,8-octanediol, 1,9-nonanediol, 1,10-decanediol, 1,12-octadecanediol, and the like.

In an exemplary embodiment of the present invention, the biodegradable composite material may be produced by further including a compound having a tri- or higher functional group and performing polymerization. In this case, the biodegradable composite material may have further improved mechanical properties. Though it is not clear, this effect is exhibited by the compound which supplements a portion where a crosslinking point is not formed by the natural polymer nanofiber.

In some exemplary embodiments, the compound having a tri- or higher functional group may be any one or more selected from a tri- or higher functional alcohol, a tri- or higher functional carboxylic acid or a derivative thereof, a tri- or higher functional hydroxy acid or a derivative thereof, and the like.

In some exemplary embodiments, the tri- or higher functional hydroxy acid may be any one or more selected from malic acid, tartaric acid, citric acid, and the like.

In some exemplary embodiments, the compound having a tri- or higher functional group may be included in an amount of 0.01 to 0.5 mol %, based on 100 mol % of the diol. In this case, the compound is faithful to the role of supplementing the natural polymer nanofiber, and allows the biodegradable composite material to have excellent mechanical properties.

In an exemplary embodiment of the present invention, the biodegradable composite material may satisfy the following Equation 1:

$$\frac{TS_1}{TS_0} \times 100 \geq 110(\%) \qquad \text{[Equation 1]}$$

wherein $TS_1$ is a tensile strength of the biodegradable composite material, and $TS_0$ is a tensile strength of a material obtained by polymerizing the mixture without the aqueous dispersion of the natural polymer nanofiber.

In an exemplary embodiment of the present invention, the biodegradable composite material may satisfy the following Equation 2:

$$\frac{TT_1}{TT_0} \times 100 \geq 110(\%) \qquad \text{[Equation 2]}$$

wherein $TT_1$ is a tear strength of the biodegradable composite material, and $TT_0$ is a tear strength of a material obtained by polymerizing the mixture without the aqueous dispersion of the natural polymer nanofiber.

In addition, the present invention provides a method of producing a biodegradable composite material including: preparing a mixed dispersion including an aqueous dispersion of a natural polymer nanofiber, a dicarboxylic acid or a derivative thereof, and a diol; and polymerizing the mixed dispersion.

The production method of the present invention is not a method of polymerizing a dicarboxylic acid or a derivative thereof and a diol to produce polyester first and using a melt mixing method or a solution mixing method to compound the polyester with a natural polymer nanofiber.

Unlike this method, the production method of the present invention is polymerizing a dicarboxylic acid or a derivative thereof and a diol in a monomer phase with an aqueous dispersion of a natural polymer nanofiber. Thus, the natural polymer nanofiber may form a crosslinking point which is uniformly distributed in the biodegradable composite material, and thus, the produced biodegradable composite material may show significantly improved mechanical properties.

In particular, the production method of the present invention has a big feature in adopting not the natural polymer nanofiber itself, but the aqueous dispersion thereof. In this case, a biodegradable composite material having significantly excellent mechanical properties may be produced. This may be confirmed more specifically in the Examples and the Comparative Examples described later.

In the production method of the present invention, when the mixed dispersion is prepared, the mixing order of the aqueous dispersion of the natural polymer nanofiber, the dicarboxylic acid or the derivative thereof, and the diol is not particularly limited. For example, the aqueous dispersion of the natural polymer nanofiber may be mixed with the diol and then mixed with the dicarboxylic acid or the derivative thereof, or conversely, the aqueous dispersion of the natural polymer nanofiber may be first mixed with the dicarboxylic acid or the derivative thereof and then mixed with the diol.

In some exemplary embodiments, the step of preparing the mixed dispersion may involve stirring, ultrasonification, homogenization, and the like for further improving a dispersity of the natural polymer nanofiber.

In the production method of the present invention, the aqueous dispersion of the natural polymer nanofiber, the dicarboxylic acid, and the diol may be as described above, and thus, the detailed description will be omitted.

In an exemplary embodiment of the present invention, the mixed dispersion may further include a compound having a tri- or higher functional group. In this case, the compound supplements a portion where the natural polymer nanofiber does not form a crosslinking point, thereby producing a biodegradable composite material having further improved mechanical properties. Here, the compound having a tri- or higher functional group may be as described above, and thus, the detailed description thereof will be omitted.

In an exemplary embodiment of the present invention, the step of preparing a mixed dispersion may include preparing a slurry including a dicarboxylic acid or a derivative thereof and a diol; homogenizing the slurry; and mixing the homogenized slurry and an aqueous dispersion of a natural polymer nanofiber. In this case, the dispersity of the dicarboxylic acid or the derivative thereof is also improved, so that the natural polymer nanofiber may form a crosslinking point which is more uniformly distributed in the degradable composite material. Thus, the biodegradable composite material may have further improved mechanical properties.

Here, the step of homogenizing the slurry may be performed by various homogenization methods which may be usually adopted in the art. For example, it may be performed by a physical method such as mechanical dispersion and ultrasonification.

In some exemplary embodiments, the step of homogenizing the slurry may include heating the slurry. In this case, the dicarboxylic acid or the derivative thereof may have better dispersity to increase the effect described above.

In some exemplary embodiments, the step of heating the slurry may be performed in a temperature range where esterification or transesterification of the slurry does not occur. However, a temperature range where esterification or transesterification occurs a little is fine. The specific temperature range varies depending on the dicarboxylic acid or the derivative thereof and the diol adopted, and thus, it is difficult to predict the range. However, for example, in the case of adipic acid and 1,4-butanediol, heating may be performed in a temperature range of 80 to 130° C.

In the production method of the present invention, polymerization conditions in the step of polymerizing the mixed dispersion are not particularly limited. That is, the polymerization conditions known in the art may be adopted and applied, depending on the dicarboxylic acid or the derivative thereof and the diol adopted.

In an exemplary embodiment of the present invention, the step of polymerizing the mixed dispersion may include subjecting the mixed dispersion to an esterification or transesterification reaction to form an oligomer; and subjecting the oligomer to a polycondensation reaction.

In some exemplary embodiments, the step of polymerizing the mixed dispersion may use a catalyst for promoting polymerization and performing stable polymerization. The catalyst may be any one or more selected from for example, calcium acetate, manganese acetate, magnesium acetate, zinc acetate, monobutyltin oxide, dibutyltin oxide, dibutyltin dichloride, tetraphenyltin, tetrabutyltin, tin octylate, tetramethyl titanate, tetraisopropyl titanate, tetrabutyl titanate, tetra (2-ethylhexyl) titanate, and the like.

In addition, the present invention provides a method of producing a biodegradable composite material, including: preparing a mixed dispersion including an aqueous dispersion of a natural polymer nanofiber, a first dicarboxylic acid or a derivative thereof, and a first diol; subjecting the mixed dispersion to an esterification or transesterification reaction to form an oligomer; and further introducing a second dicarboxylic acid or a derivative thereof and a second diol to the oligomer and performing polymerization.

This is a method of, considering a planned use amount of the dicarboxylic acid or the derivative thereof, mixing and reacting a part of the dicarboxylic acid or the derivative thereof with the aqueous dispersion of the natural polymer nanofiber and the diol first to form a lower polymerized oligomer, and then further introducing the dicarboxylic acid or the derivative thereof and the diol and polymerizing them with the oligomer. In this case, as confirmed in the Examples described later, a biodegradable composite material having better mechanical properties may be produced. This is because, though it is not clear, the reaction proceeds sequentially, whereby the natural polymer nanofiber forms a crosslinking point which is more uniformly distributed in the biodegradable composite material.

The step of preparing the mixed dispersion may be performed as described above, and thus, the detailed description thereof will be omitted.

The aqueous dispersion of the natural polymer nanofiber may be as described above, and thus, the detailed description will be omitted.

In addition, as the first dicarboxylic acid and the second dicarboxylic acid, the dicarboxylic acid as described above may be adopted and as the first diol and the second diol, the diol as described above may be adopted, and thus, the detailed description thereof will be omitted.

The first dicarboxylic acid and the second dicarboxylic acid may be the same as or different from each other. Likewise, the first diol and the second diol may be the same as or different from each other.

In the oligomer formation step and the polymerization step, for performing a smooth and stable reaction, a catalyst may be used. As the catalyst, those as described above may be adopted, and thus, the detailed description will be omitted.

In addition, the polymerization step may be, though not particularly limited, subjecting the oligomer and the second dicarboxylic acid or the derivative thereof and the second diol which are further introduced to an esterification or transesterification reaction and then performing polycondensation.

Hereinafter, the preferred Examples and Comparative Examples of the present invention will be described. However, the following Examples are only a preferred exemplary embodiment of the present invention, and the present invention is not limited thereto.

Evaluation Method (1) Tensile Test

A tensile strength and an elongation were measured according to ASTM D638-Type V, using equipment of Instron 5943. Measurement was performed at a load cell of 10 kN and a crosshead speed of 100 mm/min at 25° C. An average value of five measurements was obtained.

(2) Tear Test

A tear strength was measured according to a test method of KS M ISO 34-1:2009.

EXAMPLES 1 TO 4

0.05 wt % of a chitin nanofiber (0.05 g, diameter of 10-20 nm, length of 1-3 μm) relative to a theoretical yield of the final product (100 g) was introduced to distilled water, and dispersed for 10 minutes using an ultrasonic generator to produce an aqueous dispersion of the chitin nanofiber (2.5 g).

2.5 g of the produced aqueous dispersion of the chitin nanofiber was introduced to 1.4-butanediol (0.76 mol, 68.30 g) and treated for 10 minutes with the ultrasonic generator. The resultant was introduced to a reactor with an adipic acid (0.24 mol, 34.61 g) and dimethyl terephthalate (0.24 mol, 45.99 g), and then stirred at 10 rpm for 1 hour under a nitrogen atmosphere to obtain a mixed dispersion.

<Esterification/Transesterification Reaction>

The mixed dispersion was heated up to 140° C. to be completely melted, and then 500 ppm of $Ti(OBu)_4$ as a catalyst was introduced. Thereafter, the dispersion was heated to 180° C. (10° C./min) while stirred at 150 rpm, and maintained for 2 hours. The dispersion was heated up to 210° C. and maintained for 2 hours more, and then a by-product was removed therefrom.

<Polycondensation Reaction>

The product was transferred to a reactor equipped with an overhead stirrer, and heated up to 170° C. under a nitrogen atmosphere. After the product was completely melted, the melt was stirred at 50 rpm and heated up to 240° C. (10° C./min), and the pressure was adjusted to 100 mTorr by gradual pressure reduction. When the density of the internal reactant was increased by torque measurement by the overhead stirrer, the stirring speed was decreased to 30 rpm and maintained for 60 minutes.

The final product was quenched with water and dried in a vacuum oven at room temperature for 48 hours to produce a biodegradable composite material.

The above process repeated except that the introduction amount of the chitin nanofiber was different as 0.5 wt % (Example 2), 0.005 wt % (Example 3), and 2.0 wt % (Example 4), thereby further producing biodegradable composite materials.

The tensile strength, the elongation, and the tear strength of the produced biodegradable composite materials were measured and are shown in the following Table 1.

EXAMPLES 5 TO 8

A biodegradable composite material was produced in the same manner as in Example 1, except that instead of the chitin nanofiber, 0.05 wt % of a cellulose nanofiber (0.05 g, diameter of 10-20 nm, length of 1-3 μm) relative to the theoretical final yield of the product (100 g) was introduced to distilled water to produce an aqueous dispersion of the cellulose nanofiber (2.5 g) and using it.

The above process repeated except that the introduction amount of the cellulose nanofiber was different as 0.5 wt % (Example 6), 0.005 wt % (Example 7), and 2.0 wt % (Example 8), thereby further producing biodegradable composite materials.

The tensile strength, the elongation, and the tear strength of the produced biodegradable composite materials were measured and are shown in the following Table 1.

EXAMPLE 9

1,4-Butanediol (0.38 mol, 34.15 g) and an adipic acid (0.24 mol, 34.61 g) were introduced to a reactor and heated at 90° C. while stirring to produce a uniform slurry.

The aqueous dispersion of the chitin nanofiber produced in Example 1 was introduced to the produced slurry, and treated for 10 minutes with an ultrasonic generator. This was stirred at 10 rpm for 1 hour under a nitrogen atmosphere to obtain a mixed dispersion.

<Primary Reaction: Esterification Reaction>

The mixed dispersion was heated up to 140° C. to be completely melted, and then 500 ppm of Ti(OBu)$_4$ as a catalyst was introduced. The dispersion was heated to 180° C. (10° C./min) while stirred at 150 rpm, and maintained for 2 hours.

<Secondary Reaction: Transesterification Reaction>

1,4-Butanediol (0.38 mol, 34.15 g) and dimethyl terephthalate (0.24 mol, 45.99 g) were further introduced to the reactor. Thereafter, the dispersion was heated up to 210° C. and maintained for 2 hours, and then a by-product was removed therefrom.

<Polycondensation Reaction>

The product was transferred to a reactor equipped with an overhead stirrer, and heated up to 170° C. under a nitrogen atmosphere. After the product was completely melted, the melt was stirred at 50 rpm and heated up to 240° C. (10° C./min), and the pressure was adjusted to 100 mTorr by gradual pressure reduction. When the density of the internal reactant was increased by torque measurement by the overhead stirrer, the stirring speed was decreased to 30 rpm and maintained for 60 minutes.

The final product was quenched with water and dried in a vacuum oven at room temperature for 48 hours to produce a biodegradable composite material.

The tensile strength, the elongation, and the tear strength of the produced biodegradable composite materials were measured and are shown in the following Table 1.

EXAMPLE 10

A biodegradable composite material was produced in the same manner as in Example 9, except that instead of the aqueous dispersion of the chitin nanofiber produced in Example 1, the aqueous dispersion of the cellulose nanofiber produced in Example 5 was used.

The tensile strength, the elongation, and the tear strength of the produced biodegradable composite materials were measured and are shown in the following Table 1.

EXAMPLE 11

A biodegradable composite material was produced in the same manner as in Example 1, except that 0.05 mol % of a tartaric acid (0.38 mmol) relative to 1,4-butanediol was further introduced to 1,4-butanediol.

The tensile strength, the elongation, and the tear strength of the produced biodegradable composite materials were measured and are shown in the following Table 1.

EXAMPLE 12

A biodegradable composite material was produced in the same manner as in Example 1, except that 0.05 mol % of a citric acid (0.38 mmol) relative to 1,4-butanediol was further introduced to 1,4-butanediol.

The tensile strength, the elongation, and the tear strength of the produced biodegradable composite materials were measured and are shown in the following Table 1.

COMPARATIVE EXAMPLE 1

Polybutylene adipate-co-terephthalate (PBAT) was produced in the same manner as in Example 1, except that the aqueous dispersion of the chitin nanofiber was not used.

The tensile strength, the elongation, and the tear strength of produced PBAT were measured and are shown in the following Table 2.

COMPARATIVE EXAMPLES 2 AND 5

A biodegradable composite material was produced in the same manner as in Example 1, except that instead of the aqueous dispersion of the chitin nanofiber, 0.05 wt % of the chitin nanofiber itself was introduced to 1,4-butanediol.

The above process repeated except that the introduction amount of the chitin nanofiber was different as 0.5 wt % (Comparative Example 3), 0.005 wt % (Comparative Example 4), and 2.0 wt % (Comparative Example 5), thereby further producing biodegradable composite materials.

The tensile strength, the elongation, and the tear strength of the produced biodegradable composite materials were measured and are shown in the following Table 2.

TABLE 1

|  | Introduction amount of natural polymer nanofiber (wt %) | Tensile strength (MPa) | Elongation (%) | Tear strength (Kgf/cm) |
| --- | --- | --- | --- | --- |
| Example 1 | 0.05 | 65 | 1160 | 265 |
| Example 2 | 0.5 | 63 | 1150 | 240 |
| Example 3 | 0.005 | 47 | 990 | 182 |
| Example 4 | 2.0 | 45 | 930 | 178 |
| Example 5 | 0.05 | 66 | 1160 | 266 |
| Example 6 | 0.5 | 68 | 1170 | 280 |
| Example 7 | 0.005 | 49 | 1020 | 185 |
| Example 8 | 2.0 | 47 | 930 | 181 |
| Example 9 | 0.05 | 70 | 1200 | 271 |
| Example 10 | 0.05 | 71 | 1190 | 270 |
| Example 11 | 0.05 | 70 | 1220 | 302 |
| Example 12 | 0.05 | 69 | 1220 | 303 |

TABLE 2

|  | Introduction amount of natural polymer nanofiber (wt %) | Tensile strength (MPa) | Elongation (%) | Tear strength (Kgf/cm) |
| --- | --- | --- | --- | --- |
| Comparative Example 1 | — | 35 | 750 | 140 |
| Comparative Example 2 | 0.05 | 56 | 1040 | 225 |
| Comparative Example 3 | 0.5 | 55 | 1015 | 201 |
| Comparative Example 4 | 0.005 | 41 | 870 | 152 |
| Comparative Example 5 | 2.0 | 40 | 820 | 151 |

As confirmed from Tables 1 and 2 above, the Examples using the aqueous dispersion of the natural polymer nanofiber showed significantly improved mechanical properties as compared with PBAT of Comparative Example 1. This is considered as being an effect which is exhibited by forming a crosslinking point uniformly distributed in the biodegradable composite material.

In particular, the Examples using the aqueous dispersion containing the natural polymer nanofiber in an amount of 0.05 wt % or 0.5 wt % based on the total weight of the biodegradable composite material, showed about twice the tensile strength and tear strength values and about 1.5 times the elongation values, which are significantly improved mechanical properties.

In Examples 9 and 10, a slurry of 1,4-butanediol and an adipic acid was heated and homogenized, and then mixed with the aqueous dispersion of the natural polymer nanofiber and subjected to a primary reaction to form an oligomer, and dimethyl terephthalate and 1,4-butanediol were further introduced and the reactants were subjected to a secondary reaction. In this case, as confirmed from the above table, the mechanical properties were further improved as compared with Example 1. This is considered to be because, though it is not clear, due to the improved dispersity of the adipic acid by heating and homogenization and sequential reactions consisting of primary and secondary reactions, the natural polymer nanofiber formed a more uniformly distributed crosslinking point.

In Examples 11 and 12, a tartaric acid or a citric acid was further included in the production of the mixed dispersion, and an effect of a further increase by about 10% in the tensile strength and the tear strength and about 5% in the elongation as compared with Example 1 was shown. This is considered as being, though it is not clear, an effect exhibited by a tartaric acid or a citric acid which supplements a portion where a crosslinking point is not formed by the natural polymer nanofiber.

In addition, it was confirmed from Tables 1 and 2 that Comparative Examples 2 to 5 using the chitin nanofiber itself had somewhat deteriorated improvement effect of mechanical properties, as compared with Examples 1 to 4 using the same amount of the chitin nanofiber but in the form of the aqueous dispersion.

More specifically, upon comparison of Example 1 with Comparative Example 2, Example 2 with Comparative Example 3, and the like in which the same amount of the chitin nanofiber was used, it was confirmed that the Examples showed higher tensile strength, elongation, and tear strength values by about 20%.

Accordingly, it was confirmed that when the natural polymer nanofiber was used not in its own form, but as the aqueous dispersion thereof, the mechanical properties of the biodegradable composite material may be further significantly improved.

What is claimed is:

1. A biodegradable composite material produced by polymerizing a mixture including:
    an aqueous dispersion of a natural polymer nanofiber including any one or more selected from the group consisting of a chitin nanofiber and a cellulose nanofiber;
    a dicarboxylic acid or a derivative thereof; and
    a diol,
    wherein an amount of the natural polymer nanofiber in the aqueous dispersion of the natural polymer nanofiber is 0.05 to 0.5 wt % based on a total of 100 wt % of the biodegradable composite material.

2. The biodegradable composite material of claim 1, wherein a concentration of the natural polymer nanofiber in the aqueous dispersion of the natural polymer nanofiber is 0.1 to 50 wt %%, based on a total of 100 wt % of the aqueous dispersion of the natural polymer nanofiber.

3. The biodegradable composite material of claim 1, wherein the natural polymer nanofiber has a diameter of 1 to 200 nm and a length of 100 nm to 100 μm.

4. The biodegradable composite material of claim 1, wherein the biodegradable composite material is produced by polymerizing the mixture further comprising:
    any one or more selected from the group consisting of a tri- or higher functional alcohol; a tri- or higher functional carboxylic acid or a derivative thereof; and a tri- or higher functional hydroxy acid or a derivative thereof.

5. The biodegradable composite material of claim 1, wherein the biodegradable composite material satisfies the following Equation 1:

$$\frac{TS_1}{TS_0} \times 100 \geq 110 (\%) \qquad \text{[Equation 1]}$$

wherein $TS_1$ is a tensile strength of the biodegradable composite material, and $TS_0$ is a tensile strength of a material obtained by polymerizing the mixture without the aqueous dispersion of the natural polymer nanofiber.

6. The biodegradable composite material of claim 1, wherein the biodegradable composite material satisfies the following Equation 2:

$$\frac{TT_1}{TT_0} \times 100 \geq 110 (\%)$$ [Equation 2]

wherein $TT_1$ is a tear strength of the biodegradable composite material, and $TT_0$ is a tear strength of a material obtained by polymerizing the mixture without the aqueous dispersion of the natural polymer nanofiber.

7. A method of producing a biodegradable composite material, the method comprising:
preparing a mixed dispersion including an aqueous dispersion of a natural polymer nanofiber including any one or more selected from the group consisting of a chitin nanofiber and a cellulose nanofiber, a dicarboxylic acid or a derivative thereof, and a diol; and
polymerizing the mixed dispersion
wherein an amount of the natural polymer nanofiber in the aqueous dispersion of the natural polymer nanofiber is 0.05 to 0.5 wt % based on a total of 100 wt % of the biodegradable composite material.

8. The method of producing a biodegradable composite material of claim 7, wherein the mixed dispersion further comprises any one or more selected from the group consisting of a tri- or higher functional alcohol; a tri- or higher functional carboxylic acid or a derivative thereof; and a tri- or higher functional hydroxy acid or a derivative thereof.

9. The method of producing a biodegradable composite material of claim 7, wherein the preparing of the mixed dispersion includes:
preparing a slurry including the dicarboxylic acid or the derivative thereof and the diol;
homogenizing the slurry; and
mixing the homogenized slurry with the aqueous dispersion of the natural polymer nanofiber including any one or more selected from the group consisting of the chitin nanofiber and the cellulose nanofiber.

10. A method of producing a biodegradable composite material, the method comprising:
preparing a mixed dispersion including an aqueous dispersion of a natural polymer nanofiber including any one or more selected from the group consisting of a chitin nanofiber and a cellulose nanofiber, a first dicarboxylic acid or a derivative thereof, and a first diol;
subjecting the mixed dispersion to an esterification or transesterification reaction to form an oligomer; and
further introducing a second dicarboxylic acid or a derivative thereof and a second diol to the oligomer and performing polymerization,
wherein an amount of the natural polymer nanofiber in the aqueous dispersion of the natural polymer nanofiber is 0.05 to 0.5 wt % based on a total of 100 wt % of the biodegradable composite material.

* * * * *